United States Patent [19]

Erzinger et al.

[11] Patent Number: 4,508,536

[45] Date of Patent: Apr. 2, 1985

[54] SOLID DYE MIXTURES FOR DYEING POLYACRYLONITRILE NAVY BLUE TO BLACK

[75] Inventors: Paul Erzinger, Liestal; Arnulf R. Läpple, Aesch, both of Switzerland

[73] Assignee: Ciba-Geigy Corporation, Ardsley, N.Y.

[21] Appl. No.: 551,393

[22] Filed: Nov. 14, 1983

[30] Foreign Application Priority Data

Nov. 16, 1982 [CH] Switzerland ................. 6668/82

[51] Int. Cl.$^3$ ...................... D06P 67/02; C09B 26/04
[52] U.S. Cl. .................................. 8/639; 8/524; 8/539; 8/922; 8/927
[58] Field of Search ............... 8/639, 539, 524

[56] References Cited

U.S. PATENT DOCUMENTS 3,942,946 3/1976 Okaniwa et al. ............... 8/639

FOREIGN PATENT DOCUMENTS 56947 8/1982 European Pat. Off. .

*Primary Examiner*—A. Lionel Clingman
*Attorney, Agent, or Firm*—Edward McC. Roberts

[57] ABSTRACT

A preparation containing a mixture of dyes for dyeing polyacrylonitrile materials in navy blue to black shades, the dyeings obtained being distinguished in particular by a very good fastness to light.

10 Claims, No Drawings

SOLID DYE MIXTURES FOR DYEING POLYACRYLONITRILE NAVY BLUE TO BLACK

The invention relates to a solid dye preparation containing a navy blue to black mixture of cationic dyes, to processes for the production thereof, and to processes for dyeing materials dyeable with cationic dyes by use of this preparation.

Navy blue and black mixtures of cationic dyes are known. For the adjustment of their shades, these mixtures contain in particular basic dyes such as malachite green and/or fuchsin, and optionally also chrysoidine and/or auramine. The disadvantage of mixtures of this type is mainly that, when they are applied to polyacrylonitrile, their fastness to light is adequate only in deep shades; that they frequently exhibit an uneven build-up on account of the starting components having a differing capacity for being combined; and that they have poor fastness to light and an unsatisfactory build-up. Furthermore, the mixtures as such have low solubility in water and are not stable in storage.

From the European Patent Application No. 56 947, there are also known dye mixtures formed from three cationic dyes, which mixtures can be used for dyeing in black shades synthetic fibres modified by acid groups.

It was the object of the present invention to provide a dye mixture which would not have the aforementioned disadvantages, and which moreover would be more universally applicable.

This object has now been achieved by the development of a solid dye preparation which is free from malachite green and/or fuchsin, which when applied gives navy blue to black shades, and which contains in the preferred embodiment thereof, as the essential constituent, a mixture of three cationic azo and/or hydrazone dyes. Furthermore, this preparation has a coloring strength greater than that of the dye mixtures according to the stated European Patent Application No. 56 947, a factor which represents as economic advantage.

The invention thus relates to a novel solid, navy blue to black preparation containing at least one cationic yellow component of the formula

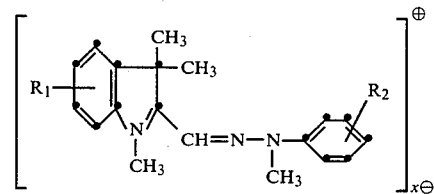

and/or

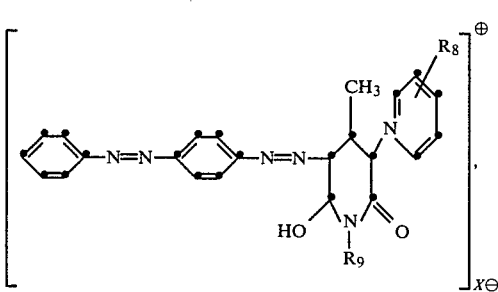

at least one cationic red component of the formulae

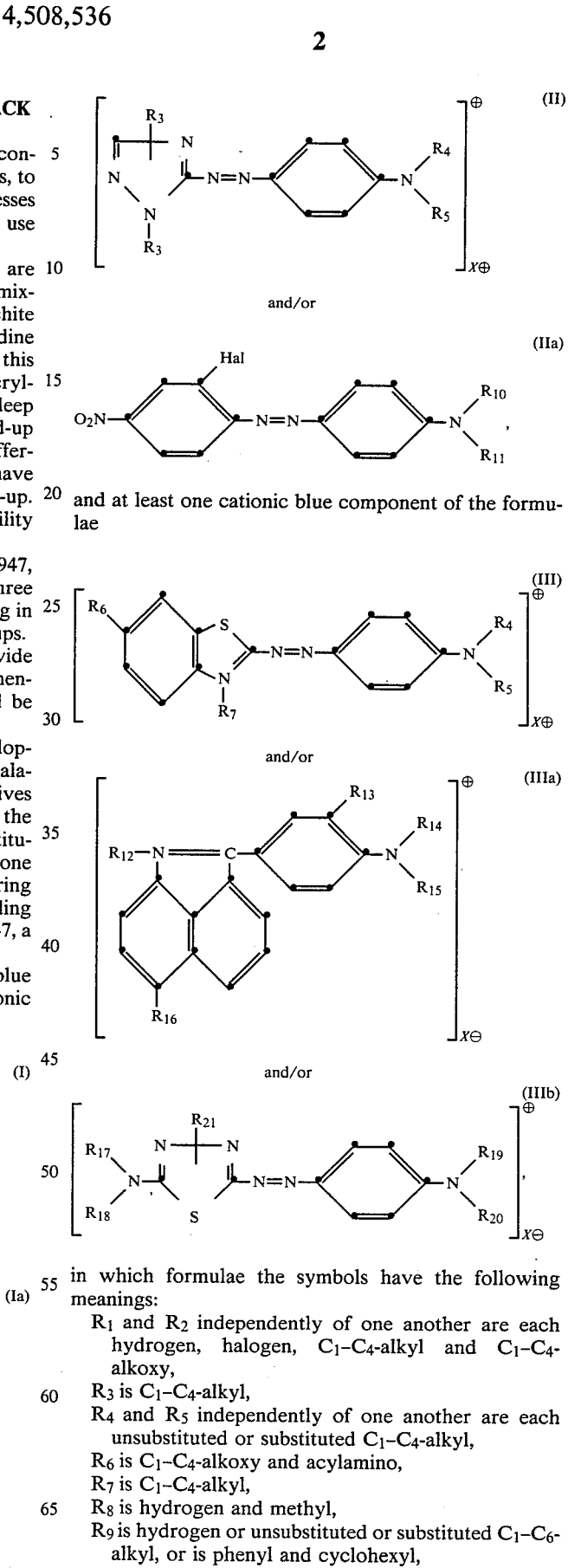

and at least one cationic blue component of the formulae in which formulae the symbols have the following meanings:

$R_1$ and $R_2$ independently of one another are each hydrogen, halogen, $C_1$–$C_4$-alkyl and $C_1$–$C_4$-alkoxy, $R_3$ is $C_1$–$C_4$-alkyl, $R_4$ and $R_5$ independently of one another are each unsubstituted or substituted $C_1$–$C_4$-alkyl, $R_6$ is $C_1$–$C_4$-alkoxy and acylamino, $R_7$ is $C_1$–$C_4$-alkyl, $R_8$ is hydrogen and methyl, $R_9$ is hydrogen or unsubstituted or substituted $C_1$–$C_6$-alkyl, or is phenyl and cyclohexyl, Hal is chlorine and bromine, $R_{10}$ is $C_1-C_4$-alkyl, $R_{11}$ is a radical of any one of the formulae

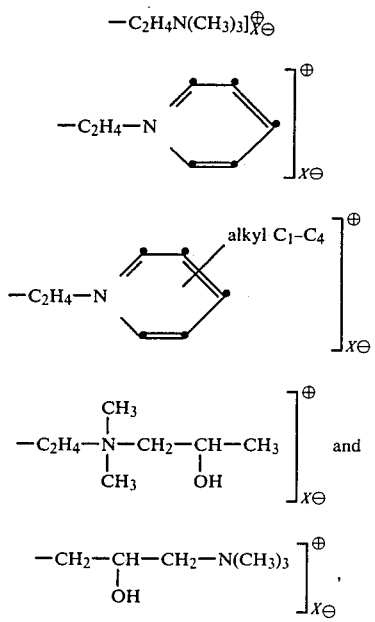

$R_{12}$ is $C_1-C_4$-alkyl, $R_{13}$ is hydrogen, $C_1-C_4$-alkyl or $C_1-C_4$-alkoxy, $R_{14}$ is hydrogen, $C_1-C_4$-alkyl or phenyl, $R_{15}$ is unsubstituted or substituted $C_1-C_4$-alkyl, $R_{16}$ is hydrogen and halogen, $R_{17}$, $R_{18}$, $R_{19}$ and $R_{20}$ independently of one another are each unsubstituted or substituted $C_1-C_6$-alkyl, or $R_{17}$ forms with $R_{18}$, with inclusion of the N atom and optionally further hetero atoms, a heterocyclic 5- or 6-membered ring, $R_{21}$ is unsubstituted or substituted $C_1-C_3$-alkyl, and X is an anionic radical, and optionally further additives.

The dyes of the given formulae are known. A preferred preparation contains for example 10 to 15, particularly 12 to 14, % by weight of yellow component(s); 3 to 15, especially 10 to 12, % by weight of red component(s); and 45 to 55, in particular 47 to 51, % by weight of blue component(s). This composition constitutes a navy blue mixture.

A further preferred preparation contains for example 20 to 25, particularly 22 to 24, % by weight of yellow component(s); 7 to 12, especially 9 to 10, % by weight of red component(s); and 15 to 20, in particular 17 to 19, % by weight of blue component(s). This composition constitutes a black mixture.

$R_1$, $R_2$ and $R_{16}$ as halogen are for example the fluorine, chlorine or bromine atom.

When $R_1$, $R_2$, $R_3$, $R_4$, $R_5$, $R_6$, $R_7$, $R_9$, $R_{10}$, $R_{12}$, $R_{13}$, $R_{14}$, $R_{19}$ and $R_{20}$ is a $C_1-C_4$-alkyl, $C_1-C_6$-alkyl or $C_1-C_4$-alkoxy group, this is a straight-chain or branched-chain group, for example: the methyl, ethyl, n-propyl, n-butyl, iso-butyl, tert-butyl, methoxy, ethoxy, n-propoxy or isobutoxy group. In the case of $R_4$, $R_5$, $R_9$, $R_{19}$ and $R_{20}$, the $C_1-C_4$ or $C_1-C_6$-alkyl group can be further substituted; substituents can be for example the hydroxyl and phenyl groups. And in the case of $R_{15}$, the $C_1-C_4$-alkyl group can be further substituted, for example by OH, halogen and $C_1-C_4$-alkoxy.

When $R_{17}$ and $R_{18}$ together form a heterocycle, this is in particular a morpholine or piperazine ring.

In this connection, there are for $R_4$ and $R_5$ the following advantageous combinations: $R_4$ = unsubstituted $C_1-C_4$-alkyl and $R_5$ = substituted $C_1-C_4$-alkyl; and also $R_4$ and $R_5$ = substituted $C_1-C_4$-alkyl.

If $R_6$ is an acylamino group, it can be a benzoylamino group or preferably an acetylamino group. When the $C_1-C_3$-alkyl group denoted by $R_{21}$ is substituted, the substituent is in particular OH.

Preferred preparations contain as yellow component(s) those of the formulae

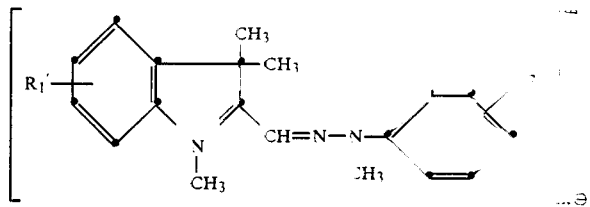

and/or

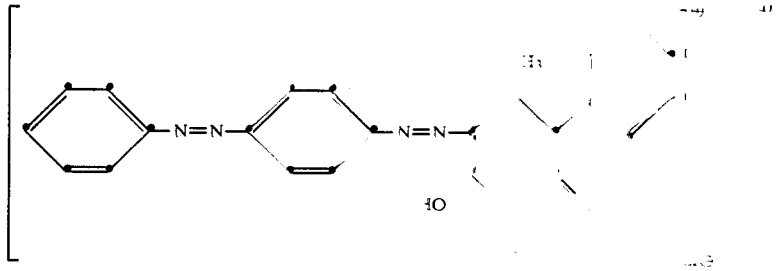

as red component(s) those of the formulae

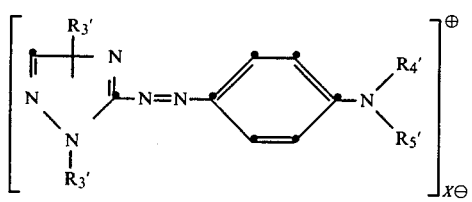

and/or

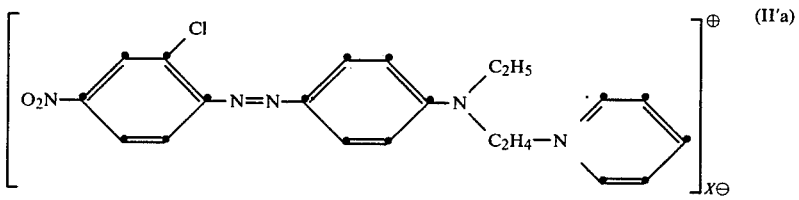

and/or

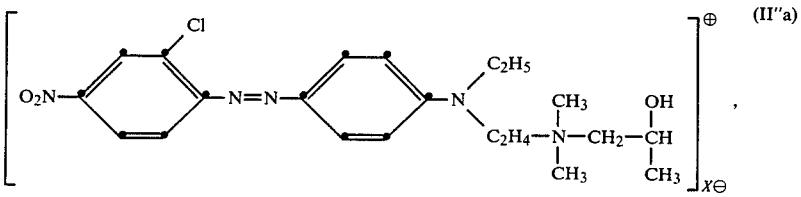

and as blue component(s) those of the formulae

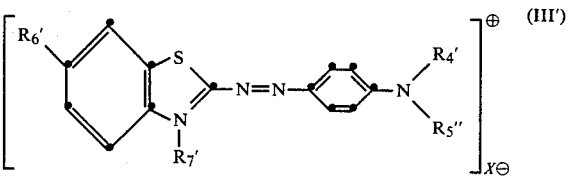

and/or

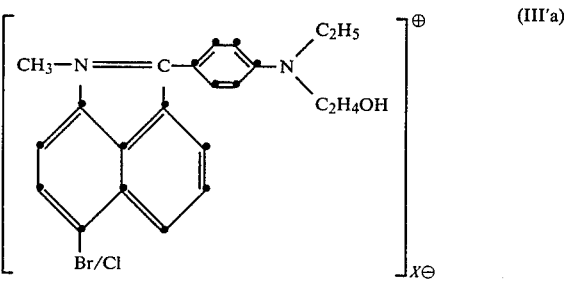

and/or

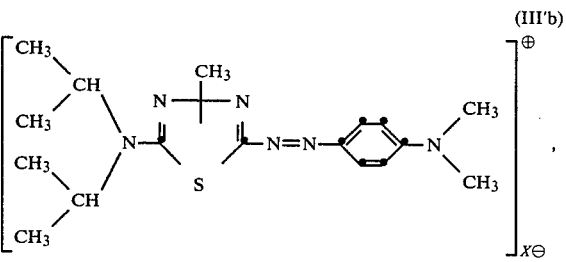

in which formulae the symbols have the following meanings: $R_1'$ is hydrogen, $R_2'$ is a $C_1$-$C_4$-alkoxy group, $R_3'$ is the methyl group, $R_4'$ is the methyl or ethyl group, $R_5'$ is a methyl or ethyl group each substituted by phenyl, $R_5''$ is a methyl, ethyl or propyl group each substituted by hydroxyl, $R_6'$ is the methoxy group, $R_7'$ is the methyl or ethyl group, and X is an anion.

Particularly preferred however are preparations which contain as yellow component that of the formula I, as red component that of the formula II, and as blue component that of the formula III.

The anions X can be both inorganic and organic ions, for example: halogen, such as fluoride, chloride, bromide or iodide ions, also boron tetrafluoride, sulfate, methyl sulfate, aminosulfate, perchlorate, carbonate, bicarbonate, phosphate, phosphomolybdate, phosphotungstate, phosphotungstomolybdate, benzenesulfonate, naphthalenesulfonate, 4-chlorobenzenesulfonate, oxalate, maleinate, formiate, acetate, propionate, lactate, succinate, chloroacetate, tartrate, methanesulfonate or benzoate ions, or complex anions, such as that of zinc chloride double salts.

Preferred anions X are, in connection with the formulae I and Ia, halogen, with the formulae II and IIa halogen or zinc chloride, and with the formulae III, IIIa and IIIb halogen or methyl sulfate.

In the novel preparations, the yellow, red and blue dyes can consist each of a single component or alternatively of a mixture of components of identical or similar shade. When the dye consists of a mixture, this has the advantage that certain properties of a dye can be varied by the addition of a further dye of the same or similar shade.

The novel preparations of the invention contain, besides the dye mixture as defined, optionally further customary additives, such as extenders (for example dextrin, sodium sulfate, sodium chloride, sodium methyl sulfate or other salts which are already present from the synthesis as accompanying substances), antidusting agents (for example polyoxypropylene glycols formed from propylene oxide and ethylene oxide, adducts formed from stearyl-diphenyl-hydroxyethyldiethylene-triamine and ethylene oxide, as well as mixtures of paraffin oil and a nonionic emulsifier) and/or cationic or nonionic dispersing agents.

The novel dye preparations are very deeply coloured pulverulent preparations; they have excellent solubility in water (about 100 g/liter at 30° C.), have very good stability to hard water, and are both stable to pH values in the customary range for polyacrylonitrile fibres and to high temperature up to 110° C.

The novel preparations are produced for example by mixing together the yellow, red and blue components at room temperature in a grinding and mixing apparatus, optionally adding to the mixture, before, during or after grinding, the further additives, and processing the resulting mixture into the form of non-dusty preparations.

The novel dye preparations according to the present invention have a great application potential, and can be used in all customary dyeing processes, particularly on polyacrylonitrile materials, for example for dyeing cheeses with a ratio of goods to liquor of 1:10, or for hank dyeing with a ratio of goods to liquor of 1:40. At a dyeing temperature of for example 97°–104° C., the dyeing duration is 120–60 minutes.

The invention relates therefore also to processes for dyeing and printing textile materials which are dyeable with cationic dyes, especially textile materials which consist for example advantageously of homo- or copolymers of acrylonitrile, or polyesters which are modified by acidic groups. Dyeing is preferably performed in an aqueous, slightly acid medium by the exhaust process or by the pad-steam process. The textile material can be in the widest variety of make-up forms, for example it can be in the form of tow, slubbing, loose fibres, yarn, fabrics, knitwear, filaments, piece goods and finished articles, such as shirts and pullovers.

In addition, the novel preparations can be used for dyeing polyacrylonitrile wet tow, and likewise for dyeing the polyacrylonitrile constituent in mixed fabrics, for example mixed fabrics made from polyacrylonitrile and cellulose, polyacrylonitrile and wool, polyacrylonitrile and polyamide, polyacrylonitrile and polyester as well as polyacrylonitrile and polyacrylonitrile which is acid dyeable.

The textile materials dyed with these novel preparations have very good fastness properties and performance characteristics. In this connection, mention is made in particular of the neutral shade, the negligible change of shade in artifical light, the very good fastness to light in all depths of shade (from grey to black and from dull blue to navy blue) and the good build-up properties.

It may also be mentioned that the novel dye mixtures have, as black and navy blue dyeings, a good thermal stability and good stability to hydrolysis; and that for example when subsequent steaming of blended (mouliné) yarns is carried out, the white fibres do not stain.

A further important advantage of the novel preparation of the invention is that it can be used as a filler and deepening component; the preparation can be combined with cationic coloured dyes, and can thus be used as a shading component. This opens up the novel possibility of being able to produce economically dull shades on polyacrylonitrile. It is possible for example for each of the individual dyes I, II and III of the novel mixture to be shaded with the novel preparation containing for example the mixture of dyes I, II and III. When for example the yellow dye I is shaded with the novel preparation, the most varied olive shades can be obtained; when the red dye II is shaded with the novel preparation, the most varied ruby to claret shades can be obtained; and when the blue dye III is shaded with the novel preparation, the most varied blue shades are obtainable. And finally it is also possible to mix the novel preparations with one another, for example the navy-blue mixture with the black mixture, the widest variety of grey and navy blue shades being then obtained.

The invention is further illustrated by the following Examples but its scope is not limited by them. The term 'parts' in the Examples denotes parts by weight.

EXAMPLE 1

The following components are processed, in a suitable grinding and mixing apparatus, in each case into the form of a pourable, negligibly dusty preparation:

a) Black preparation 22.5 parts of the dye of the formula

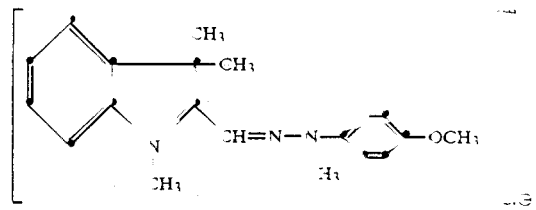

9.6 parts of the dye of the formula

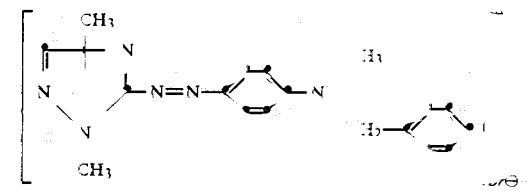

17.6 parts of the dye of the formula

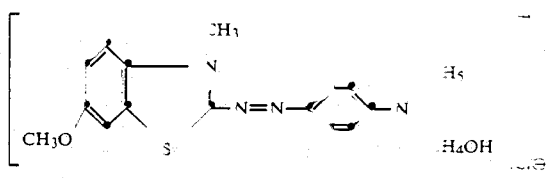

44.3 parts of anhydrous sodium sulfate, and 6.0 parts of a mixture of paraffin oil and a nonionic emulsifier as antidusting agent.

b) Navy blue preparation 13.0 parts of the dye of the formula 11.0 parts of the dye of the formula

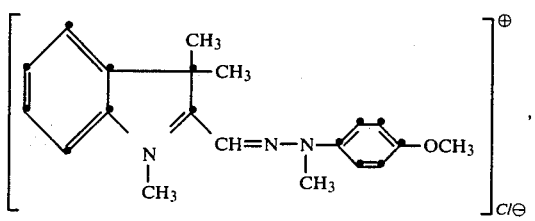

49.2 parts of the dye of the formula

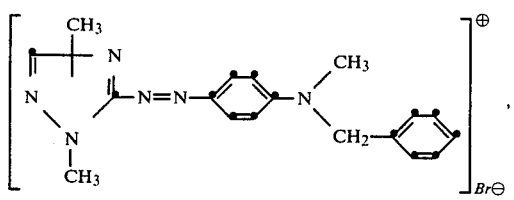

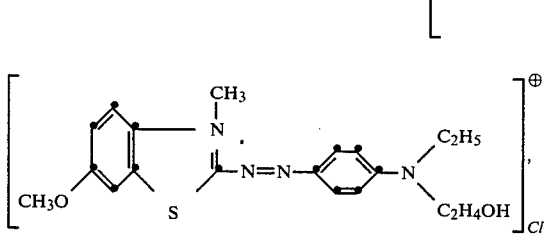

21.3 parts of anhydrous sodium sulfate, and
5.5 parts of a mixture of paraffin oil and a nonionic emulsifier as antidusting agent.

The described black and navy blue preparations thus obtained are negligibly dusty and are free from zinc.

EXAMPLE 2

92 kg of continuously pretextured Euroacril (polyacrylonitrile) high-bulk yarn as wound packages are introduced into a Henriksen circulation dyeing machine containing an aqueous dye liquor (about 1300 liters) at 70° C. consisting of 0.5% of an aqueous solution of an alkylphenolethoxylate, 2% of 80% acetic acid, 1% of crystallised sodium acetate and 2760 g of the black dye mixture according to Example 1, and the material is treated for 5 minutes with the liquor circulation being from the inside to the outside. The liquor is subsequently heated within 30 minutes to 100° C., and dyeing is performed for 60 minutes at this temperature. The liquor is then cooled to 50° C., and the material is rinsed, centrifuged and dried. A Euroacril yarn dyed in a level deep black shade is obtained.

EXAMPLE 3

100 kg of Dralon (polyacrylonitrile) weaving yarn on cheeses are introduced, in a Then cheese-dyeing machine, into a dye liquor (about 1200 l) at 75° C. containing 0.5% of an aqueous solution of an alkylphenolethoxylate, 2% of 80% acetic acid, 1% of crystallised sodium acetate, 5% of calcined Glauber's salt and 500 g of a black dye mixture according to Example 1, as well as 1% of an aqueous solution of dodecyldimethylbenzylammonium chloride, and the material is treated for 5 minutes with the liquor circulation being from the inside to the outside. The liquor is subsequently heated within 45 minutes to 100° C. and dyeing is performed at this temperature for 60 minutes. The bath is then cooled, and the material is rinsed, centrifuged and dried. There is obtained a Dralon yarn which is dyed in a level neutral grey shade distinguished by very good fastness to light.

EXAMPLE 4

51 kg of Dolan (polyacrylonitrile) weaving yarn on cheeses are introduced, in a Scholl cheese-dyeing machine, into an aqueous dye liquor (about 750 l) at 75° C. containing 0.5% of an aqueous solution of an alkylphenolethoxylate, 2% of 80% acetic acid, 1% of crystallised sodium acetate and 306 g of a black dye mixture according to Example 1, as well as 408 g of the red dye of the formula

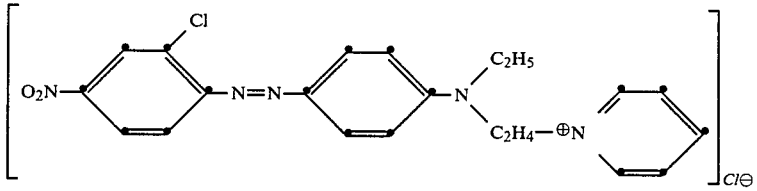

and 1% of an aqueous solution of dodecyldimethylbenzylammonium chloride, and the material is treated at this temperature with the liquor circulation being from the inside to the outside. The liquor is subsequently heated within 45 minutes to 100° C., and dyeing is performed at this temperature for 60 minutes. The liquor is then cooled, and the dyed material is rinsed, centrifuged and dried. A Dolan yarn levelly dyed in a brown shade distinguished by very good fastness to light is obtained.

EXAMPLE 5

25 kg of Orlon 42 (polyacrylonitrile) yarn (as hanks) are introduced, in a Scholl circular dyeing machine, into an aqueous dye liquor (about 750 l) at 80° C. containing 0.5% of an aqueous solution of an alkylphenolethoxylate, 2% of 80% acetic acid, 1% of crystallised sodium acetate, 10% of calcined Glauber's salt and 200 g of the dye of the formula

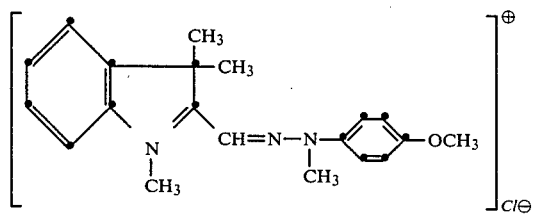

together with 12.5 g of the navy blue preparation according to Example 1, and 1% of an aqueous solution of dodecylmethylbenzylammonium chloride, and the material is treated at this temperature for 10 minutes. The liquor is then heated to 100° C. in the course of 45 minutes, and dyeing is performed at this temperature for 60 minutes. The liquor is subsequently cooled to 60° C., and the material is rinsed, centrifuged and dried. There is thus obtained an Orlon yarn levelly dyed in an olive shade having very good fastness to light.

EXAMPLE 6

225 kg of Euroacril (polyacrylonitrile) fabric are introduced, in an R-jet dyeing machine, into an aqueous dye liquor (about 2200 l) at 70° C. containing 0.5% of an aqueous solution of an alkylphenolethoxylate, 2% of 80% acetic acid, 1% of crystallised sodium acetate, 5% of Glauber's salt (calcined) and 1800 g of the dye of the formula

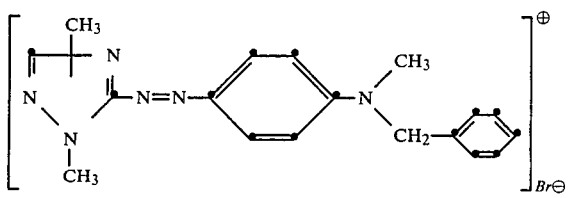

together with 112.5 g of the navy blue preparation according to claim 1, and 0.8% of an aqueous solution of dodecylmethylbenzylammonium chloride, and a material speed of 160 m/min. is maintained for 5 minutes. The liquor is subsequently heated to 100° C. at the rate of 0.5° C. per minute, and dyeing is performed at this temperature for 30 minutes. The liquor is then cooled at 2° C. per minute to 50° C., and the material is rinsed, dewatered and dried. A fabric levelly dyed in a claret shade distinguished by very good fastness to light is obtained.

EXAMPLE 7

100 kg of continuously pretextured Euroacril (polyacrylonitrile) high-bulk yarn as wound packages are introduced, in a Henriksen circulation dyeing machine, into an aqueous dye liquor (about 1300 l) at 70° C. which contains 0.5% of an aqueous solution of an alkylphenolethoxylate, 2% of 80% acetic acid, 1% of crystallised sodium acetate and 1200 g of the navy blue preparation according to Example 1, and the material is treated for 5 minutes with the liquor circulation being from the inside to the outside. The liquor is subsequently heated within 30 minutes to 100° C., and dyeing is performed at this temperature for 60 minutes. The dye bath is then cooled to 50° C., and the material is rinsed, centrifuged and dried. A Euroacril yarn levelly dyed in a navy blue shade is obtained.

EXAMPLE 8

The components listed in Tables 1 and 2 are processed, in a suitable grinding and mixing apparatus, into the form of a negligibly dusty preparation according to the invention. With the following variants A-J (Table 1) there is obtained a black preparation, and with the variants K-S (Table 2) a navy blue preparation.

TABLE 1

| Dye | variant | A | B | C | D | E | F | G | H |
|---|---|---|---|---|---|---|---|---|---|
| I″ | parts | 22.3 | — | 5.5 | 22.5 | — | — | .3 | 22.8 | 7.5 |
| I′a | parts | — | 4.8 | — | — | 5 | .8 | 7.2 | — | — |
| II″ | parts | 1.3 | 2.0 | — | 1.3 | — | — | .2 | 1.0 | — |
| II′a | parts | — | — | 0.3 | — | 0.8 | 4.0 | — | — | |
| III″ | parts | — | 9.8 | — | — | — | 8 | 9.8 | .9 | — |
| III′a | parts | — | — | — | 9.0 | — | — | — | .5 | 2.0 |
| III′b | parts | 2.8 | — | 3.3 | — | 2.8 | — | — | — | — |
| sodium sulfate (anhydrous) | parts | 47.6 | 47.4 | 54.9 | 33.2 | 10.9 | 51.4 | 43.6 | 5.3 | 3.2 |
| antidusting agent | parts | 2 | 2 | 2 | 2 | . | . | 2 | | |

TABLE 2

| Dye | variant | K | L | M | N | O | P | Q | R |
|---|---|---|---|---|---|---|---|---|---|
| I″ | parts | 2.3 | — | .4 | 3.5 | — | — | 9 | 4.3 | 2 |
| I′a | parts | — | 3.2 | — | — | .6 | .7 | 4.1 | — | — |
| II″ | parts | 2.8 | 4.1 | — | 0.0 | — | — | .4 | 2.4 | — |
| II′a | parts | — | — | 4.5 | — | 5 | 1.8 | — | — | |
| III″ | parts | — | 22.5 | — | — | — | 2.5 | 22.5 | 26.4 | — |
| III′a | parts | — | — | — | 18.0 | — | — | — | 5.4 | 8.0 |
| III′b | parts | 23.7 | — | 23.7 | — | 2.7 | — | — | — | — |
| sodium sulfate, (anhydrous) | parts | 25.7 | 19.7 | 44.9 | 2.0 | 47.1 | 26.5 | 20.6 | .3 | — |
| antidusting agent | parts | 5.5 | 5.5 | 5.5 | 5.5 | .5 | .5 | 5.5 | .5 | 5 |

Dye I″:

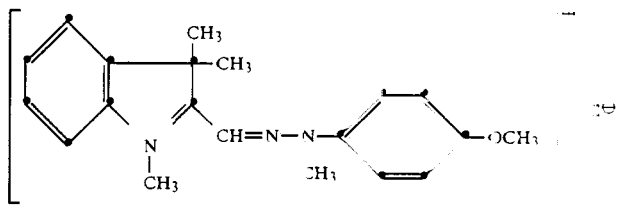

Dye II″:

-continued

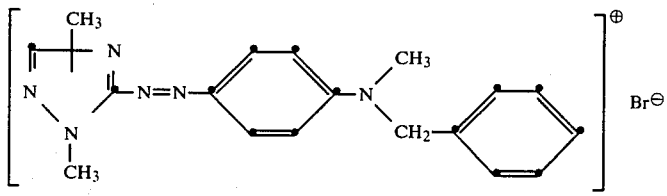

Dye III'':

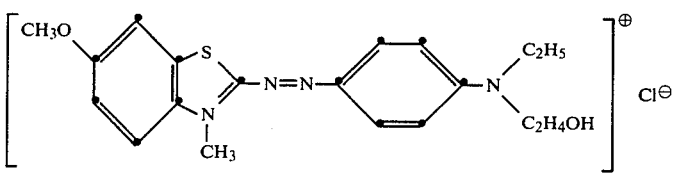

Dye I'a:

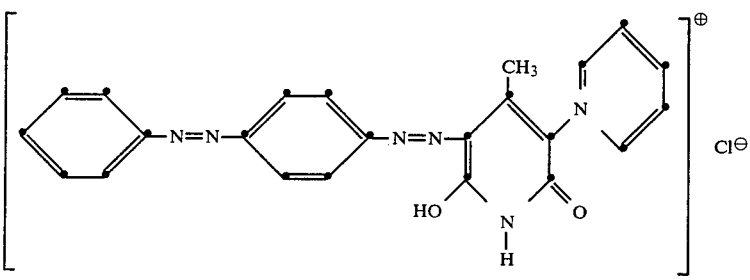

Dye II'a:

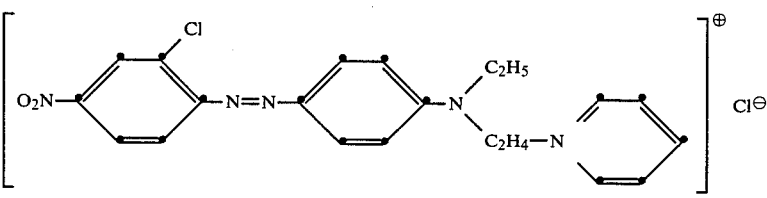

Dye III'a:

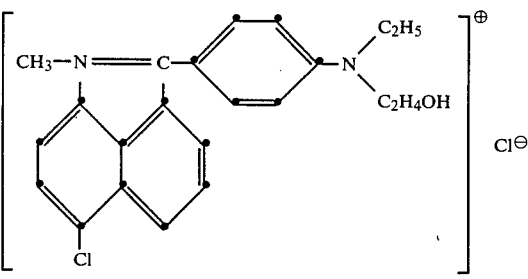

Dye III'b:

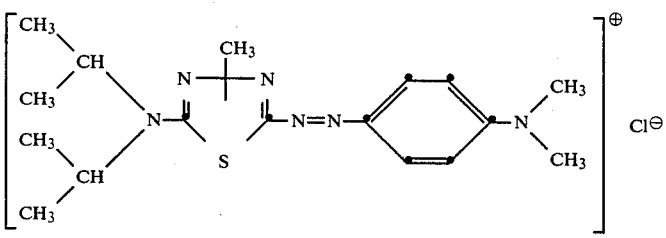

EXAMPLE 9

190 kg of Euroacril (polyacrylonitrile) slubbing in the form of wound packages are introduced, in a Henriksen circulation dyeing apparatus, into an aqueous dye liquor (about 2200 l) containing 0.5% of an aqueous solution of an alkylphenolethoxylate, 2% of 80% acetic acid, 1% of crystallised sodium acetate and 2300 g of the navy blue preparation according to Example 8, variant R.

The material is intended for a é lange with dyed woollen slubbing. An exact conformity of the polyacrylonitrile dyeing with the wool dyeing, even by evening light, is required. The slightly reddish evening shade of the wool dyeing is obtained with variant R.

EXAMPLE 10

103 kg of Dolan (polyacrylonitrile) yarn (as hanks) are dyed in a Thies hank dyeing machine containing an aqueous liquor (about 3000 l) consisting of 0.5% of an aqueous solution of an alkylphenolethoxylate, 2% of 80% acetic acid, 1% of crystallised sodium acetate, 10% of calcined Glauber's salt and 750 g of the dye according to Example 8, variant H of the black preparation. A Dolan yarn dyed in a grey shade having very good fastness to light and good stability to steam is obtained. The latter is clearly better than in the case of a corresponding dyeing in which the blue constituent of the black mixture is provided solely by the dye III.

EXAMPLE 11

50 kg of hank yarn of the mixture of Dralon (polyacrylonitrile) and wool in the mixture ratio of 55:45 are dyed, in a Scholl circular dyeing machine, for 60 minutes at 98° C. in an aqueous dye liquor (about 1500 l) containing 0.5% of an aqueous solution of an alkylphenolethoxylate, 2% of 80% acetic acid, 1% of crystallised sodium acetate, 10% of Glauber's salt and 210 g of the navy blue preparation according to Example 8, variant M. There is obtained a yarn dyed in a dark dull blue shade, in which the wool constituent, in order to create an effect, has been left white. This preparation is distinguished by good stability of the dye components to the reducing action of wool decomposition products in the dye bath. This ensures a good shade stability when the dyeing time is extended, and fully satisfactory reproducibility.

What is claimed is:

1. A solid, navy blue to black preparation consisting essentially of a cationic yellow component of the formula

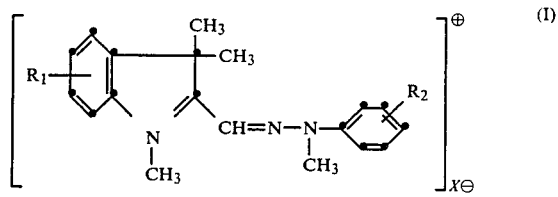

or

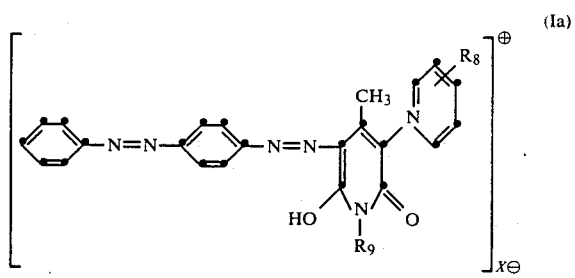

a cationic red component of the formula

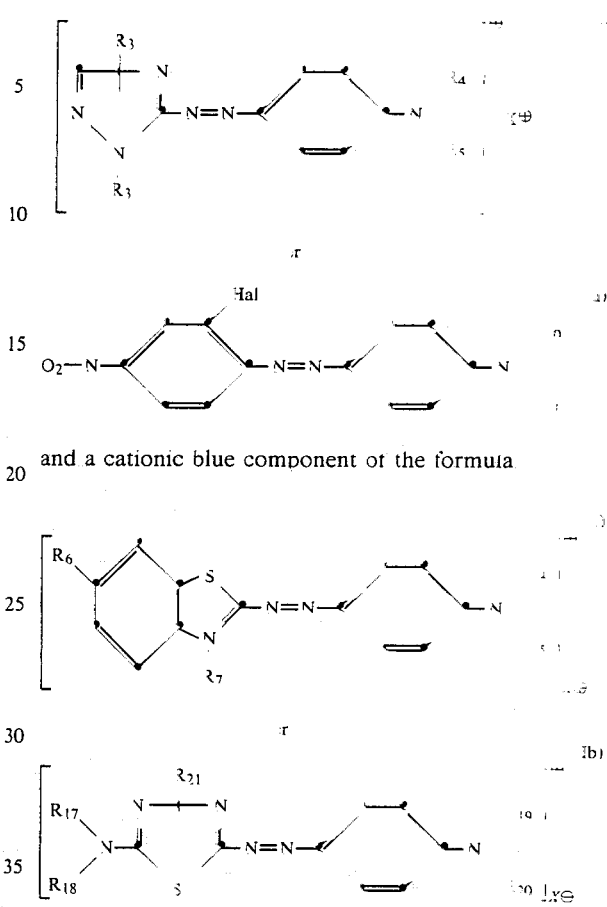

and a cationic blue component of the formula

or mixtures thereof, in which formulae the symbols have the following meanings:

$R_1$ and $R_2$ independently of one another are each hydrogen, halogen, $C_1$–$C_4$-alkyl or $C_1$–$C_4$-alkoxy, $R_3$ is $C_1$–$C_4$-alkyl, $R_4$ and $R_5$ independently of one another are each unsubstituted or substituted $C_1$–$C_4$-alkyl, $R_6$ is $C_1$–$C_4$-alkoxy or acylamino, $R_7$ is $C_1$–$C_4$-alkyl, $R_8$ is hydrogen or methyl, $R_9$ is hydrogen or unsubstituted or substituted $C_1$–$C_n$-alkyl, or is phenyl or cyclohexyl, Hal is chlorine or bromine, $R_{10}$ is $C_1$–$C_4$-alkyl, $R_{11}$ is a radical of any one of the formulae

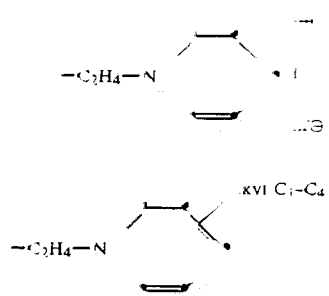

-continued

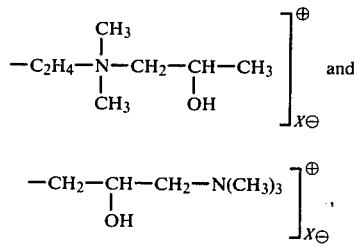

$R_{17}$, $R_{18}$, $R_{19}$ and $R_{20}$ independently of one another are each unsubstituted or substituted $C_1$–$C_6$-alkyl, or $R_{17}$ forms with $R_{18}$, with the inclusion of the N atom and optionally further hetero atoms, a heterocyclic 5- or 6-membered ring,
$R_{21}$ is unsubstituted or substituted $C_1$–$C_3$-alkyl, and
X is an anionic radical, and optionally further additives.

2. A solid navy blue preparation of claim 1, which contains:
10 to 15% by weight of yellow component(s),
8 to 15% by weight of red component(s) and
45 to 55% by weight of blue component(s).

3. A solid navy blue preparation of claim 2, which contains:
12 to 14% by weight of yellow component(s),
10 to 12% by weight of red component(s) and
47 to 51% by weight of blue component(s).

4. A solid black preparation of claim 1, which contains:
20 to 25% by weight of yellow component(s),
7 to 12% by weight of red component(s) and
15 to 20% by weight of blue component(s).

5. A solid black preparation of claim 4, which contains:
22 to 24% by weight of yellow component(s),
9 to 10% by weight of red component(s) and
17 to 19% by weight of blue component(s).

6. A solid navy blue to black preparation of claim 1, wherein
$R_1$ is hydrogen,
$R_2$ is $C_1$–$C_4$-alkoxy,
$R_3$ is methyl,
$R_4$ is methyl or ethyl,
$R_5$ is benzyl or phenethyl,
$R_5$ is methyl, ethyl or propyl group each substituted by hydroxyl,
$R_6$ is methoxy,
$R_7$ is methyl or ethyl,
$R_8$ and $R_9$ are hydrogen,
$R_{10}$ is ethyl,
$R_{11}$ is either of

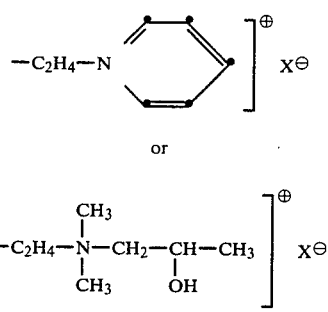

$R_{17}$, $R_{18}$, $R_{19}$, $R_{20}$ and $R_{21}$ are all methyl and Hal is chlorine.

7. A solid preparation of claim 1, which contains a yellow component that of the formula I, as red component that of the formula II, and as blue component that of the formula III.

8. A solid preparation of claim 1, which contains, as further additives: extenders, antidusting agents and/or dispersing agents.

9. A process for producing a solid preparation of claim 1, which process comprises mixing together the yellow, red and blue components at room temperature in a grinding and mixing apparatus, and optionally adding further additives to the mixture before, during or after grinding.

10. A process for dying polyacrylonitrile and acid-modified polyester materials, which process comprises the steps of dissolving a solid preparation of claim 1 in an aqueous bath, making the bath slightly acidic and then dyeing the material via the exhaust or pad-steam process.

* * * * *